US009328820B1

(12) United States Patent
Steinhauser et al.

(10) Patent No.: US 9,328,820 B1
(45) Date of Patent: May 3, 2016

(54) METHOD FOR DETECTING A NONOPERATIONAL SHIFT ELEMENT IN AN AUTOMATIC TRANSMISSION

(71) Applicant: ZF Friedrichshafen AG, Friedrichshafen (DE)

(72) Inventors: Klaus Steinhauser, Kressbron (DE); Jens Weller, Constance (DE); Georg Mihatsch, Lindau (DE); Jörg Arnold, Immenstaad (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 14/512,499

(22) Filed: Oct. 13, 2014

(51) Int. Cl.
*G06F 17/00* (2006.01)
*F16H 61/12* (2010.01)

(52) U.S. Cl.
CPC .......... *F16H 61/12* (2013.01); *F16H 2061/124* (2013.01); *F16H 2061/1276* (2013.01)

(58) Field of Classification Search
CPC .............. F16H 61/12; F16H 2061/124; F16H 2061/1276
See application file for complete search history.

(56) References Cited

U.S. PATENT DOCUMENTS

| | | | | |
|---|---|---|---|---|
| 5,515,272 A * | 5/1996 | Sakai | ...................... | F16H 61/12 180/273 |
| 2004/0235616 A1* | 11/2004 | Janecke | .................. | F16H 61/12 477/70 |
| 2005/0075776 A1* | 4/2005 | Cho | ........................ | F16H 61/12 701/62 |
| 2009/0124454 A1* | 5/2009 | Tabata | ................... | B60K 6/365 477/37 |
| 2009/0138162 A1* | 5/2009 | Futamura | .............. | F16H 1/0021 701/55 |
| 2012/0010794 A1* | 1/2012 | Sahashi | .................. | F16H 61/12 701/58 |

\* cited by examiner

*Primary Examiner* — David J Hlavka
(74) *Attorney, Agent, or Firm* — Dority & Manning, P.A.

(57) ABSTRACT

A method for detecting a malfunctioning shift element in an automatic transmission is provided. The method includes operating the automatic transmission in an intermediate gear. A selected shift element of the automatic transmission is commanded to a disengaged configuration in the intermediate gear. The method also includes measuring a gear ratio of the automatic transmission while the automatic transmission is operating in the intermediate gear, and determining whether the selected shift element of the automatic transmission is malfunctioning based at least in part on the gear ratio of the automatic transmission in the intermediate gear.

17 Claims, 4 Drawing Sheets

METHOD FOR DETECTING A NONOPERATIONAL SHIFT ELEMENT IN AN AUTOMATIC TRANSMISSION

FIELD OF THE INVENTION

The present subject matter relates generally to automatic transmissions, such as nine-speed automatic transmissions.

BACKGROUND OF THE INVENTION

Automatic transmissions generally include at least one planetary gear set and a plurality of shift elements. The shift elements selectively engage components of the planetary gear sets in order to hinder or prevent rotation of the components. Selective actuation of the shift elements adjusts the gear ratio of the automatic transmission and shifts the automatic transmission between its various gears.

Proper actuation of the shift elements provides smooth shifting between gears and improves performance of the automatic transmission. Thus, shift elements preferably adjust between engaged states and disengaged states in a reliable manner. However, shift elements can fail to adjust between the engaged and disengaged states for a variety of reasons. For example, splines of a shifting element may lock together and hold the shifting element in the engaged state.

If a shift elements sticks or does not operate properly, performance of the automatic transmission can be negatively affected. For example, if a shift element sticks in an engaged configuration, the automatic transmission can be overdetermined in gears that do not require the shift element. However, detecting proper actuation of the shift elements in order to avoid overdetermining the automatic transmission can be difficult or expensive. For example, adding an additional sensor to the automatic transmission can increase a cost and manufacturing time of the automatic transmission.

Accordingly, a method for detecting a nonoperational or malfunctioning shift element in an automatic transmission would be useful. In particular, a method for detecting a nonoperational or malfunctioning shift element in an automatic transmission that does not require a dedicated sensor for each shifting element of the automatic transmission would be useful. In addition, a method for detecting a nonoperational or malfunctioning shift element in an automatic transmission that also includes steps for operating the automatic transmission if the shift element is nonoperational or malfunctioning would be useful.

BRIEF DESCRIPTION OF THE INVENTION

The present subject matter provides a method for detecting a malfunctioning shift element in an automatic transmission. The method includes operating the automatic transmission in an intermediate gear. A selected shift element of the automatic transmission is commanded to a disengaged configuration in the intermediate gear. The method also includes measuring a gear ratio of the automatic transmission while the automatic transmission is operating in the intermediate gear, and determining whether the selected shift element of the automatic transmission is malfunctioning based at least in part on the gear ratio of the automatic transmission in the intermediate gear. Additional aspects and advantages of the invention will be set forth in part in the following description, or may be apparent from the description, or may be learned through practice of the invention.

In a first exemplary embodiment, a method for detecting a malfunctioning shift element in an automatic transmission is provided. The method includes terminating a power flow from the automatic transmission and operating the automatic transmission in an intermediate gear after the step of terminating. A selected shift element of the automatic transmission is commanded to a disengaged configuration when the automatic transmission is in the intermediate gear. The method also includes measuring a gear ratio of the automatic transmission in the intermediate gear, and determining whether the selected shift element of the automatic transmission is malfunctioning based at least in part on the gear ratio of the automatic transmission in the intermediate gear.

In a second exemplary embodiment, a method for detecting a malfunctioning shift element in an automatic transmission is provided. The method includes operating the automatic transmission in an initial gear. A selected shift element of the automatic transmission is in an engaged configuration when the automatic transmission is in the initial gear. The method also includes terminating a power flow from the automatic transmission after the step of operating the automatic transmission in the initial gear and shifting the automatic transmission to an intermediate gear after the step of terminating. The selected shift element of the automatic transmission is commanded to a disengaged configuration when the automatic transmission is in the intermediate gear. The method further includes measuring a gear ratio of the automatic transmission while the automatic transmission is operating in the intermediate gear and determining whether the selected shift element of the automatic transmission is malfunctioning based at least in part on a difference between the gear ratio of the automatic transmission in the intermediate gear from the step of measuring and a predetermined gear ratio.

In a third exemplary embodiment, a method for detecting a malfunctioning shift element in an automatic transmission is provided. The method includes terminating a power flow from the automatic transmission, operating the automatic transmission in an intermediate gear after the step of terminating, and measuring a gear ratio of the automatic transmission in the intermediate gear. The method also includes step for determining whether the selected shift element of the automatic transmission is malfunctioning.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figures 1, 2:
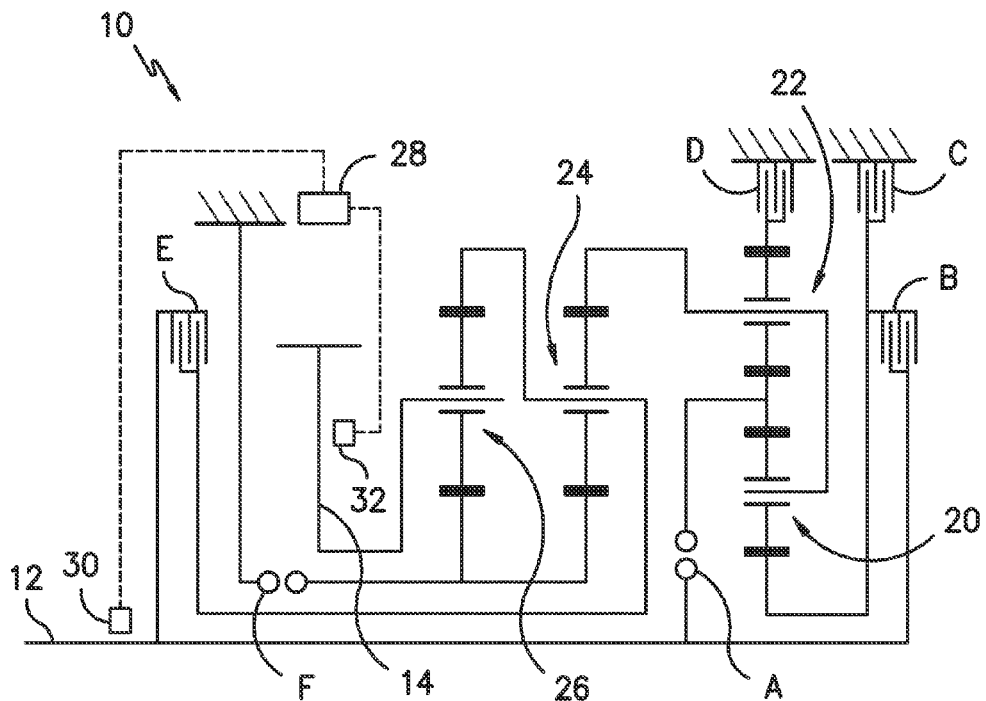
FIG. 1 provides a schematic view of an automatic transmission according to an exemplary embodiment of the present subject matter.
FIG. 2 illustrates a table of an exemplary shifting scheme as may be used with the exemplary automatic transmission of FIG. 1.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a schematic view of an automatic transmission 10 according to an exemplary embodiment of the present subject matter. Automatic transmission 10 may be constructed or arranged in a similar manner to the automatic transmission described in U.S. Pat. No. 8,398,522 to Bauknecht et al., which is hereby incorporated by reference for all purposes. Automatic transmission 10 may be used in any suitable vehicle. For example, automatic transmission 10 may be used in a passenger vehicle, such as a car, truck or sport utility vehicle (SUV). Automatic transmission 10 is configured for selectively adjusting a gear ratio of automatic transmission 10, as will be understood by those skilled in the art, in order to provide a suitable mechanical advantage to propel the associated vehicle.

As may be seen in FIG. 1, automatic transmission 10 includes an input shaft 12 and an output shaft 14. Input shaft 12 may be coupled to a turbine of a torque converter in order to link automatic transmission 10 to a motor of an associated vehicle. Output shaft 14 may be coupled a front axle drive shaft of the associated vehicle. Automatic transmission 10 may change gears in order to adjust the gear ratio between the motor and front axle drive shaft of the associated vehicle, as will be understood by those skilled in the art.

Automatic transmission 10 also includes four planetary gear sets: a first planetary gear set 20; a second planetary gear set 22; a third planetary gear set 24 and a fourth planetary gear set 26. In certain exemplary embodiments, as shown in FIG. 1, third and fourth planetary gear sets 24, 26 may be a Simpson planetary gear set, e.g., such that third and fourth planetary gear sets 24, 26 share a joint sun gear or sun gears of third and fourth planetary gear sets 24, 26 are coupled or fixed together. The sun gear of second planetary gear set 22 may also constitute the ring gear of first planetary gear set 20, and planet gears of first and second planetary gear sets 20, 22 may be mounted to a joint planet carrier that is also coupled or fixedly connected to the ring gear of third planetary gear set 24. The planet carrier of third planetary gear set 24 may also be coupled or fixedly connected to the ring gear of fourth planetary gear set 26.

As may be seen in FIG. 1, automatic transmission 10 further includes a plurality of shifting elements. In particular, automatic transmission 10 includes a plurality of non-positive shift elements and at least one positive shifting element. The non-positive shift elements may be any suitable type of non-positive shift elements. For example, the non-positive shift elements may be multidisc friction shift elements or friction bands. In the exemplary embodiment of FIG. 1, the non-positive shifting elements includes a multidisc clutch B, a multidisc brake C, a multidisc brake D and a multidisc clutch E. The positive shifting elements may also be any suitable type of positive shifting elements, e.g., that provide a form fit or torque proof connection. For example, the positive shifting elements may be dog clutches, dog brakes or claw clutches. In the exemplary embodiment of FIG. 1, the at least one positive shifting element includes a dog clutch A and a dog clutch or brake F. As used herein, the term "clutch" may refer to mechanism for coupling or connecting two rotating components and the term "brake" may refer to a mechanism for coupling or connecting a rotating component to a non-rotating or static component.

The shifting elements of automatic transmission 10 selectively adjust between an open or disengaged configuration and a closed or engaged configuration. In the disengaged configuration, the shifting elements do not engage an associated component of the four planetary gear sets, e.g., and do not or negligibly interfere with rotation of the associated component of the four planetary gear sets relative to the shifting elements. Conversely, in the engaged configuration, the shifting elements engage the associated component of the four planetary gear sets, e.g., and hinder or prevent rotation of the associated component of the four planetary gear sets relative to the shifting elements. As may be seen in FIG. 1, dog clutch A selectively connects or couples input shaft 12 to the sun gear of second planetary gear set 22 and the ring gear of first planetary gear set 20. Multidisc clutch B selectively connects or couples input shaft 12 to the sun gear of first planetary gear set 20. Multidisc brake C selectively connects or couples a transmission housing 16 to the sun gear of first planetary gear set 20. Multidisc brake D selectively connects or couples transmission housing 16 to the ring gear of second planetary gear set 22. Multidisc clutch E selectively connects or couples input shaft 12 to the planet carrier of third planetary gear set 24 and the ring gear of fourth planetary gear set 26. Dog clutch F selectively connects or couples transmission housing 16 to the sun gear of third and fourth planetary gear sets 24, 26.

Automatic transmission 10 also includes an electronic control unit 28, an input speed sensor 30 and an output speed sensor 32. Electronic control unit 28 is in operative communication with various components of automatic transmission 10, including input speed sensor 30 and output speed sensor 32, to regulate operation of automatic transmission 10. Electronic control unit 28 may include a memory and microprocessor, such as a general or special purpose microprocessor operable to execute programming instructions or micro-control code associated with operating of automatic transmission 10. The memory may represent random access memory such as DRAM, or read only memory such as ROM or FLASH. Alternatively, electronic control unit 28 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Electronic control unit 28 may be mounted on an exterior of transmission housing 16. Electronic control unit 28 is in operative communication with solenoid valves of the shifting elements of automatic transmission 10. Thus, electronic control unit 28 may selectively adjust the shifting elements between the engaged configuration and the disengaged configuration, e.g., by selectively opening and closing the associated solenoid valves of the shifting elements. In such a manner, electronic control unit 28 may shift automatic transmission 10 between gears during operation of automatic transmission 10, e.g., based at least in part on signals from input speed sensor 30 and output speed sensor 32, as will be understood by those skilled in the art.

Input speed sensor 30 is configured for measuring a speed, e.g., rotations per minute (RPM), of input shaft 12. Input speed sensor 30 may be positioned adjacent input shaft 12 or a turbine of an associated torque coupling. Input speed sensor 30 may be any suitable type of sensor. For example, input speed sensor 30 may be a Hall effect sensor, an optical sensor, etc. Electronic control unit 28 may receive a signal from input speed sensor 30 corresponding to the speed of input shaft 12.

Output speed sensor 32 is configured for measuring a speed, e.g., rotations per minute (RPM), of output shaft 14. Output speed sensor 32 may be positioned adjacent output shaft 14. Output speed sensor 32 may be any suitable type of sensor. For example, output speed sensor 32 may be a Hall effect sensor, an optical sensor, etc. Electronic control unit 28 may receive a signal from output speed sensor 32 corresponding to the speed of output shaft 14.

FIG. 2 illustrates a table 200 of an exemplary shifting scheme as may be used with automatic transmission 10. As may be seen in FIG. 2, automatic transmission 10 includes nine forward gears and one reverse gear. The forwards gears include: first gear "1", second gear "2", third gear "3", fourth gear "4", fifth gear "5", sixth gear "6", seventh gear "7", eighth gear "8", and ninth gear "9". The reverse gear is labeled "R". In table 200, cells filled with "x" indicate the engaged configuration, and blank cells indicate the disengaged configuration. Thus, e.g., dog clutch A, multidisc brake D and dog clutch F are in the engaged configuration in first gear, and multidisc clutch B, multidisc brake C and multidisc clutch E are in the disengaged configuration in first gear. As another example, dog clutch A, multidisc brake C and dog clutch F are in the engaged configuration in second gear, and multidisc clutch B, multidisc brake D and multidisc clutch E are in the disengaged configuration in second gear. In the fourth gear, dog clutch A, multidisc clutch E and dog clutch F are in the engaged configuration. It should be understood that in certain exemplary embodiments, dog clutch A need not be in the engaged configuration to operate automatic transmission 10 in fourth gear. Thus, multidisc clutch E and dog clutch F may be the only shifting elements of automatic transmission 10 in the engaged configuration to operate automatic transmission 10 in fourth gear, in certain exemplary embodiments.

As discussed above, automatic transmission 10 includes nine forward gears and one reverse gear. Thus, automatic transmission 10 is generally referred to as a "nine-speed automatic transmission." However, it should be understood that automatic transmission 10 is provided by way of example only and that the present subject matter may be used in or with any suitable automatic transmission. Thus, the present subject matter is not intended to be limited to use with automatic transmission 10. As an example, the present subject matter may be used in automatic transmissions having five forward gears, six forward gears, eight forward gears, etc.

Figure 3:
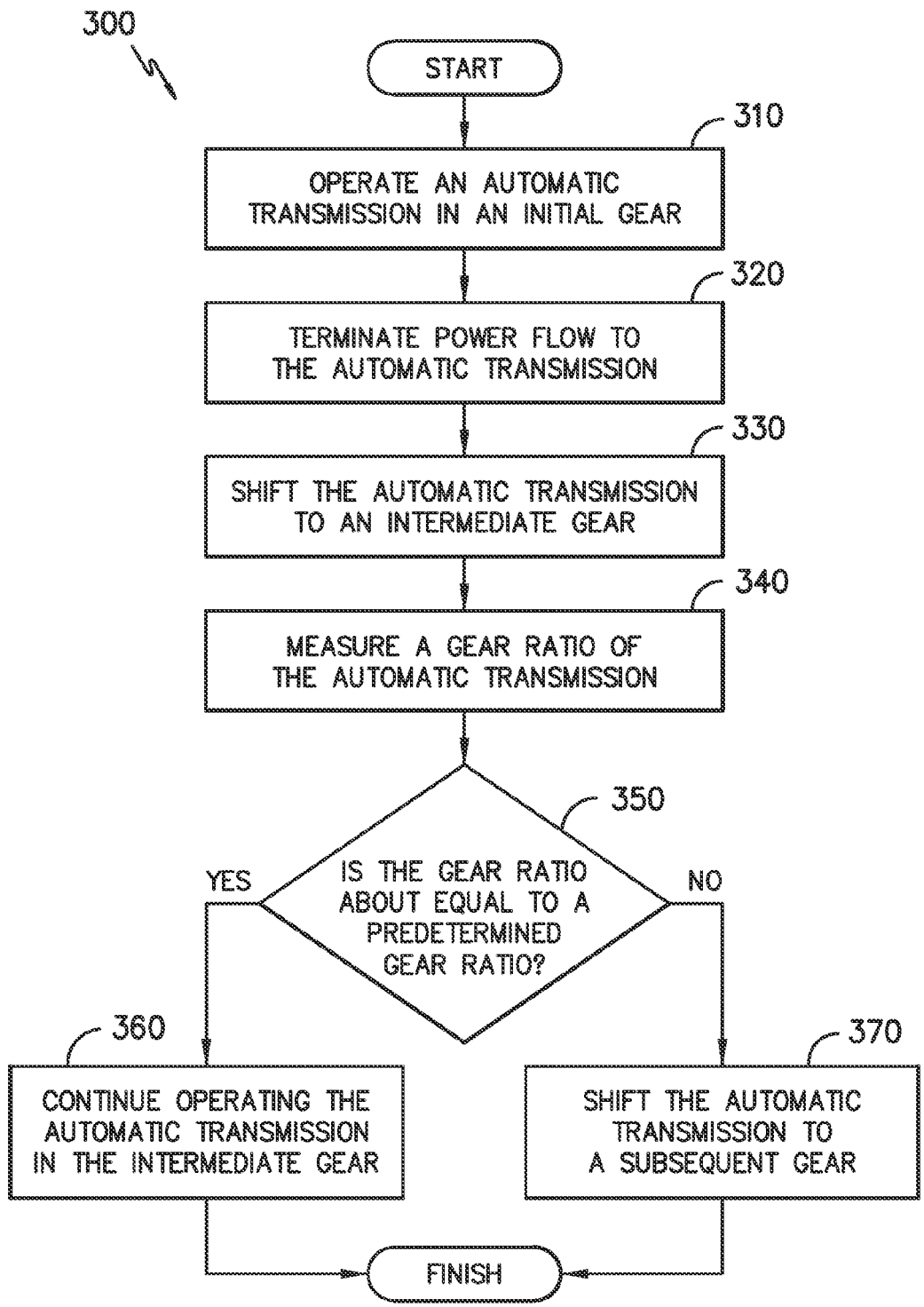
FIG. 3 illustrates a method for detecting a malfunctioning shifting element of an automatic transmission according to an exemplary embodiment of the present subject matter.

FIG. 3 illustrates a method 300 for detecting a malfunctioning shifting element of an automatic transmission according to an exemplary embodiment of the present subject matter. Method 300 may be used in or with any suitable transmission. For example, method 300 may be used with automatic transmission 10 (FIG. 1) to detect malfunctioning of one of the shifting elements of automatic transmission 10, such as dog clutch F or dog clutch A. The electronic control unit 28 of automatic transmission 10 may be programmed or configured to implement method 300. Utilizing method 300, a malfunctioning shifting element of automatic transmission 10 may be detected or identified, e.g., without a dedicated sensor, and ameliorative steps may be taken to continue operating automatic transmission 10 with any malfunctioning shifting elements.

Figure 4:
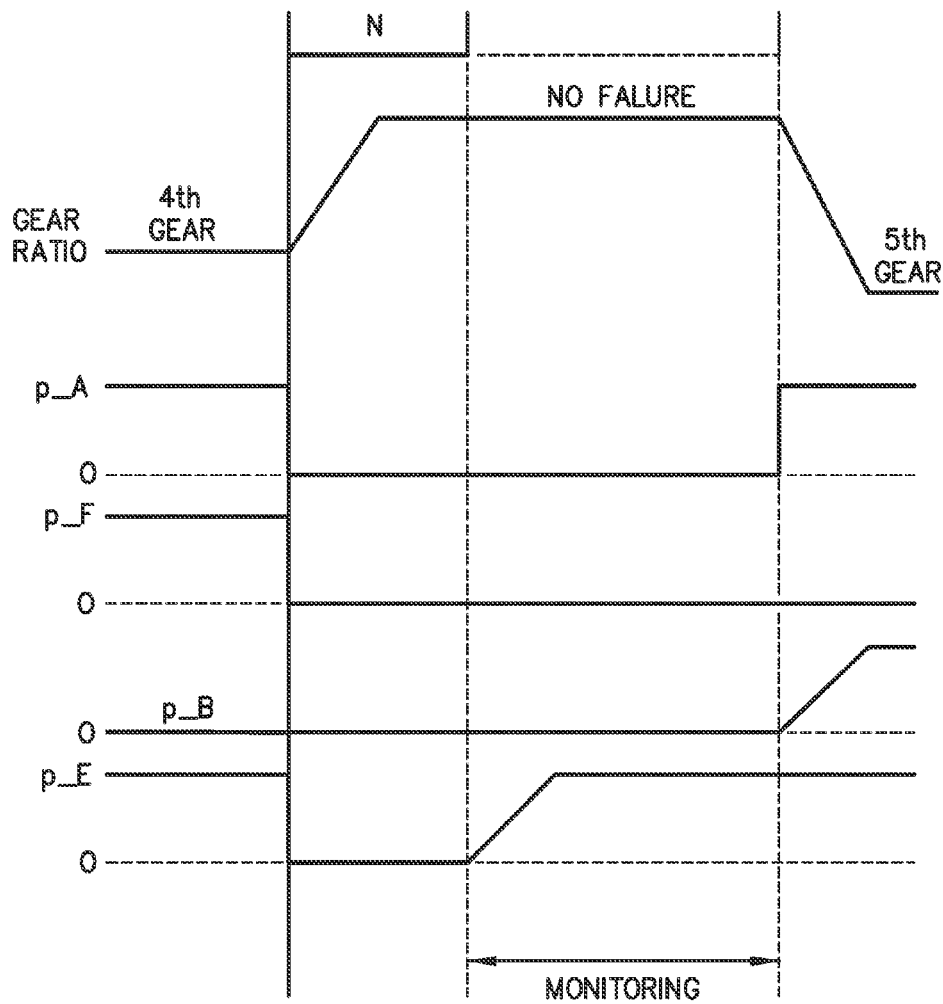
FIGS. 4 and 5 illustrate plots of shifting element actuation for the exemplary automatic transmission of FIG. 1 during the exemplary method of FIG. 3.
Figure 5:
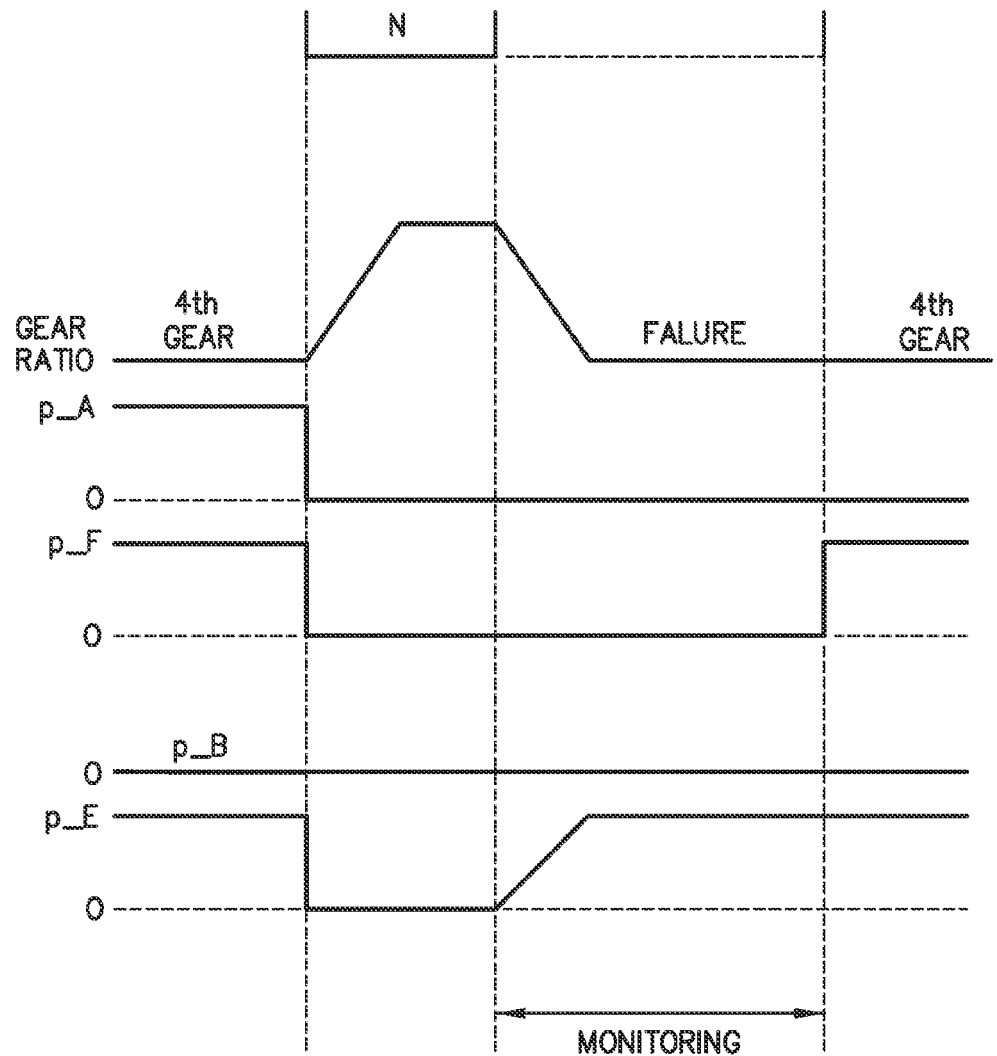

FIGS. 4 and 5 illustrate plots of shifting element actuation for automatic transmission 10 during method 300. FIG. 4 provides a plot of shifting element actuation, including actuation of dog clutch F, with dog clutch F functioning properly by shifting between the engaged configuration and the disengaged configuration. FIG. 5 provides a plot of shifting element actuation, including actuation of dog clutch F, with dog clutch F malfunctioning and stuck in the engaged configuration such that dog clutch F does not shift to the disengaged configuration. Method 300 is described in greater detail below with reference to FIGS. 4 and 5.

In FIGS. 4 and 5, lines labeled "p_A", "p_F", "p_B" and "p_E" correspond to a command pressure supplied to dog clutch A, dog clutch F, multidisc clutch B and multidisc clutch E, respectively. Electronic control unit 28 may selectively adjust the command pressure to dog clutch A, dog clutch F, multidisc clutch B and multidisc clutch E as shown in FIGS. 4 and 5, e.g., by selectively opening and closing the associated solenoid valves of the shifting elements. The line labeled "gear ratio" corresponds to the gear ratio of automatic transmission 10, e.g., measured with input speed sensor 30 and output speed sensor 32. The time period labeled "N" corresponds to a period of time when automatic transmission 10 is operated in a neutral or extended neutral gear, e.g., and power flow from automatic transmission 10 is interrupted or terminated. The time period labeled "monitoring" corresponds to a period of time when automatic transmission 10 is operated in an intermediate gear.

At step 310, automatic transmission 10 is operated in an initial gear. The initial gear may be any suitable gear of automatic transmission 10. For example, as shown in FIGS. 4 and 5, the initial gear may be the fourth gear of automatic transmission 10. Thus, dog clutch A, multidisc clutch E and dog clutch F may be in the engaged configuration at step 310, and multidisc clutch B, multidisc brake C and multidisc brake D may be in the disengaged configuration at step 310.

At step 320, power flow from automatic transmission 10 is interrupted or terminated, e.g., by shifting automatic transmission 10 to a neutral or extended neutral gear. As an example, at least one of the non-positive shift elements of automatic transmission 10 may be opened at step 320 in order to interrupt or terminate the power flow from automatic transmission 10. In particular, if automatic transmission 10 is in fourth gear at step 310, multidisc clutch E may be opened to the disengaged configuration at step 320 to terminate or interrupt the power flow from automatic transmission 10, as shown in FIGS. 4 and 5. Automatic transmission 10 does not deliver power or delivers negligible power to output shaft 14 of automatic transmission 10 when power flow from automatic transmission 10 is interrupted or terminated at step 320. Dog clutch A and dog clutch F may also be commanded to the disengaged configuration at step 320, as shown in FIGS. 4 and 5, e.g., in order to assist with interrupting or terminating the power flow from automatic transmission 10.

At step 330, automatic transmission 10 is shifted to an intermediate gear. In the intermediate gear, a selected shift element of automatic transmission 10 is commanded to the disengaged configuration. As an example, electronic control unit 28 may close a solenoid valve of dog clutch F such that a command line pressure supplied to dog clutch F is reduced, e.g., to zero, in order to command dog clutch F to adjust to the disengaged configuration at step 330, as shown in FIGS. 4 and 5. In addition, at step 330, all shifting elements of automatic transmission 10 that are necessary for the intermediate gear are actuated to the engaged configuration. Thus, as shown in FIGS. 4 and 5, multidisc clutch E may be closed in the intermediate gear at step 330.

At step 340, a gear ratio of automatic transmission 10 is measured while automatic transmission 10 is operating in the intermediate gear. As an example, electronic control unit 28 may receive speed measurements of input shaft 12 and output shaft 14 from input speed sensor 30 and output speed sensor 32, respectively, to measure the gear ratio of automatic transmission 10 at step 340. In particular, the ratio of the speed of the input shaft 12 measured with input speed sensor 30 to the speed of the output shaft 14 measured with output speed sensor 32 may directly correspond to the gear ratio of automatic transmission 10.

Method 300 also includes steps for determining whether the selected shifting element of automatic transmission 10 is malfunctioning, e.g., based at least in part on the gear ratio of automatic transmission 10 in the intermediate gear from step 340, and for operating manual transmission 10 with a malfunctioning shift element. Such steps are discussed in greater detail below. At step 350, the gear ratio of automatic transmission 10 in the intermediate gear measured at step 340 is compared to a predetermined gear ratio. The predetermined gear ratio may be any suitable gear ratio. For example, the predetermined gear ratio may be an expected gear ratio for the intermediate gear with the selected shift element in the engaged configuration. Thus, in FIGS. 4 and 5, the predetermined gear ratio may correspond to the expected gear ratio for fourth gear, e.g., about 1.382:1. In alternative exemplary embodiments, the predetermined gear ratio may be an expected gear ratio for the intermediate gear with the selected shift element in the disengaged configuration.

At step 350, electronic control unit 28 may determine whether the gear ratio of automatic transmission 10 in the intermediate gear measured at step 340 is about (e.g., within five percent of) equal to the predetermined gear ratio in order to determine whether the selected shifting element of automatic transmission 10 is malfunctioning. If the gear ratio of automatic transmission 10 in the intermediate gear measured at step 340 is not about equal to the predetermined gear ratio, the selected shifting element of automatic transmission 10 is not malfunctioning. As shown in FIG. 4, dog clutch F is commanded to the disengaged configuration in the intermediate gear. Thus, because the gear ratio of automatic transmission 10 in the intermediate gear is substantially different than the predetermined gear ratio that corresponds to the expected gear ratio for the intermediate gear with the selected shift element in the engaged configuration in FIGS. 4 and 5, dog clutch F is in the disengaged configuration. Conversely, if the gear ratio of automatic transmission 10 in the intermediate gear measured at step 340 is about equal to the predetermined gear ratio, the selected shifting element of automatic transmission 10 is malfunctioning. As shown in FIG. 5, dog clutch F is commanded to the disengaged configuration in the intermediate gear. Thus, because the gear ratio of automatic transmission 10 in the intermediate gear is equal to the predetermined gear ratio, dog clutch F is stuck in the engaged configuration and is malfunctioning.

At step 360, automatic transmission 10 continues to operate in the intermediate gear if the selected shifting element of automatic transmission 10 is malfunctioning. Thus, as shown in FIG. 4, automatic transmission 10 continues to operate in the intermediate gear, e.g., fourth gear, because the dog clutch F is stuck in the engaged configuration. Conversely, at step 370, automatic transmission 10 shifts to a subsequent gear if the selected shifting element of automatic transmission 10 is not malfunctioning. Thus, as shown in FIG. 5, dog clutch F may be opened to the disengaged configuration to shift automatic transmission 10 to fifth gear if dog clutch F is not malfunctioning.

In such a manner, method 300 may assist with identifying or detecting malfunctioning or inoperative shifting elements of automatic transmission 10. By detecting malfunctioning or inoperative shifting elements of automatic transmission 10, operating automatic transmission 10 while automatic transmission 10 is overdetermined can be avoided or prevented. For example, if dog clutch F is stuck in the engaged configuration, method 300 may avoid shifting automatic transmission 10 from fourth gear where dog clutch F is closed to fifth gear where dog clutch F is open. In particular, automatic transmission 10 may normally shift from fourth gear to fifth gear when an associated vehicle is moving downhill. However, if dog clutch F is stuck in the engaged configuration, method 300 may avoid shifting automatic transmission 10 to fifth gear in order to avoid overdetermining automatic transmission 10 and potentially damaging automatic transmission 10.

It should be understood that while described in the context of automatic transmission 10, method 300 may be used to detect malfunctioning shifting elements in any suitable transmission. In addition, while described in the context of detecting malfunctioning of dog clutch F, method 300 may be used to detect malfunctioning of any suitable shifting element of automatic transmission 10. For example, method 300 may be used to detecting malfunctioning of dog clutch A or multidisc brake C, in alternative exemplary embodiments.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for detecting a malfunctioning shift element in an automatic transmission, comprising:
    terminating a power flow from the automatic transmission;
    operating the automatic transmission in an intermediate gear after said step of terminating, a selected shift element of the automatic transmission being commanded to a disengaged configuration when the automatic transmission is in the intermediate gear;
    measuring a gear ratio of the automatic transmission in the intermediate gear;
    determining whether the selected shift element of the automatic transmission is malfunctioning based at least in part on the gear ratio of the automatic transmission in the intermediate gear; and
    shifting the automatic transmission to a subsequent gear if the selected shift element of the automatic transmission is not malfunctioning at said step of determining or continuing to operate the automatic transmission in the intermediate gear if the selected shift element of the automatic transmission is malfunctioning at said step of determining.

2. The method of claim 1, further comprising operating the automatic transmission in an initial gear prior to said step of terminating, the selected shift element of the automatic transmission being in an engaged configuration when the automatic transmission is in the initial gear.

3. The method of claim 2, wherein said step of terminating comprises shifting the automatic transmission from the initial gear to a neutral gear or an extended-neutral gear.

4. The method of claim 1, wherein at least one non-positive shifting element of the automatic transmission is commanded to an engaged configuration in the intermediate gear.

5. The method of claim 4, wherein at least one positive shifting element of the automatic transmission is commanded to the engaged configuration in the intermediate gear.

6. The method of claim 1, wherein said step of determining comprises:
 comparing the gear ratio of the automatic transmission in the intermediate gear to a predetermined gear ratio; and
 establishing that the selected shift element of the automatic transmission is malfunctioning if the gear ratio of the automatic transmission in the intermediate gear is about equal to the predetermined gear ratio or establishing that the selected shift element of the automatic transmission is not malfunctioning if the gear ratio of the automatic transmission in the intermediate gear is not about equal to the predetermined gear ratio.

7. The method of claim 6, wherein said step of operating the automatic transmission in the intermediate gear comprises commanding all shifting elements of automatic transmission that are necessary for the intermediate gear to an engaged configuration except for the selected shift element of the automatic transmission.

8. The method of claim 7, wherein the predetermined gear ratio is an expected gear ratio for the intermediate gear with the selected shift element in the engaged configuration.

9. A method for detecting a malfunctioning shift element in an automatic transmission, comprising:
 operating the automatic transmission in an initial gear, a selected shift element of the automatic transmission being in an engaged configuration when the automatic transmission is in the initial gear;
 terminating a power flow from the automatic transmission after said step of operating the automatic transmission in the initial gear;
 shifting the automatic transmission to an intermediate gear after said step of terminating, the selected shift element of the automatic transmission being commanded to a disengaged configuration when the automatic transmission is in the intermediate gear;
 measuring a gear ratio of the automatic transmission while the automatic transmission is operating in the intermediate gear;
 determining whether the selected shift element of the automatic transmission is malfunctioning based at least in part on a difference between the gear ratio of the automatic transmission in the intermediate gear from said step of measuring and a predetermined gear ratio; and
 shifting the automatic transmission to a subsequent gear if the selected shift element of the automatic transmission is not malfunctioning at said step of determining or continuing to operate the automatic transmission in the intermediate gear if the selected shift element of the automatic transmission is malfunctioning at said step of determining.

10. The method of claim 9, wherein said step of terminating comprises shifting the automatic transmission from the initial gear to a neutral gear or an extended-neutral gear.

11. The method of claim 9, wherein the selected shift element of the automatic transmission is a dog clutch of the automatic transmission.

12. The method of claim 9, wherein at least one non-positive shifting element of the automatic transmission is commanded to the engaged configuration in the intermediate gear.

13. The method of claim 12, wherein at least one positive shifting element of the automatic transmission is commanded to the engaged configuration in the intermediate gear.

14. The method of claim 9, wherein said step of determining comprises:
 comparing the gear ratio of the automatic transmission in the intermediate gear from said step of measuring to the predetermined gear ratio; and
 establishing that the selected shift element of the automatic transmission is malfunctioning if the gear ratio of the automatic transmission in the intermediate gear from said step of measuring is about equal to the predetermined gear ratio or establishing that the selected shift element of the automatic transmission is not malfunctioning if the gear ratio of the automatic transmission in the intermediate gear from said step of measuring is substantially greater or less than the predetermined gear ratio.

15. The method of claim 14, wherein said step of operating the automatic transmission in the intermediate gear comprises commanding all shifting elements of automatic transmission that are necessary for the intermediate gear to the engaged configuration except for the selected shift element of the automatic transmission.

16. The method of claim 15, wherein the predetermined gear ratio is an expected gear ratio for the intermediate gear with the selected shift element in the engaged configuration.

17. A method for detecting a malfunctioning shift element in an automatic transmission, comprising:
 terminating a power flow from the automatic transmission;
 operating the automatic transmission in an intermediate gear after said step of terminating;
 measuring a gear ratio of the automatic transmission in the intermediate gear;
 step for determining whether the selected shift element of the automatic transmission is malfunctioning; and
 shifting the automatic transmission to a subsequent gear if the selected shift element of the automatic transmission is not malfunctioning or continuing to operate the automatic transmission in the intermediate gear if the selected shift element of the automatic transmission is malfunctioning.

* * * * *